Figure 1:
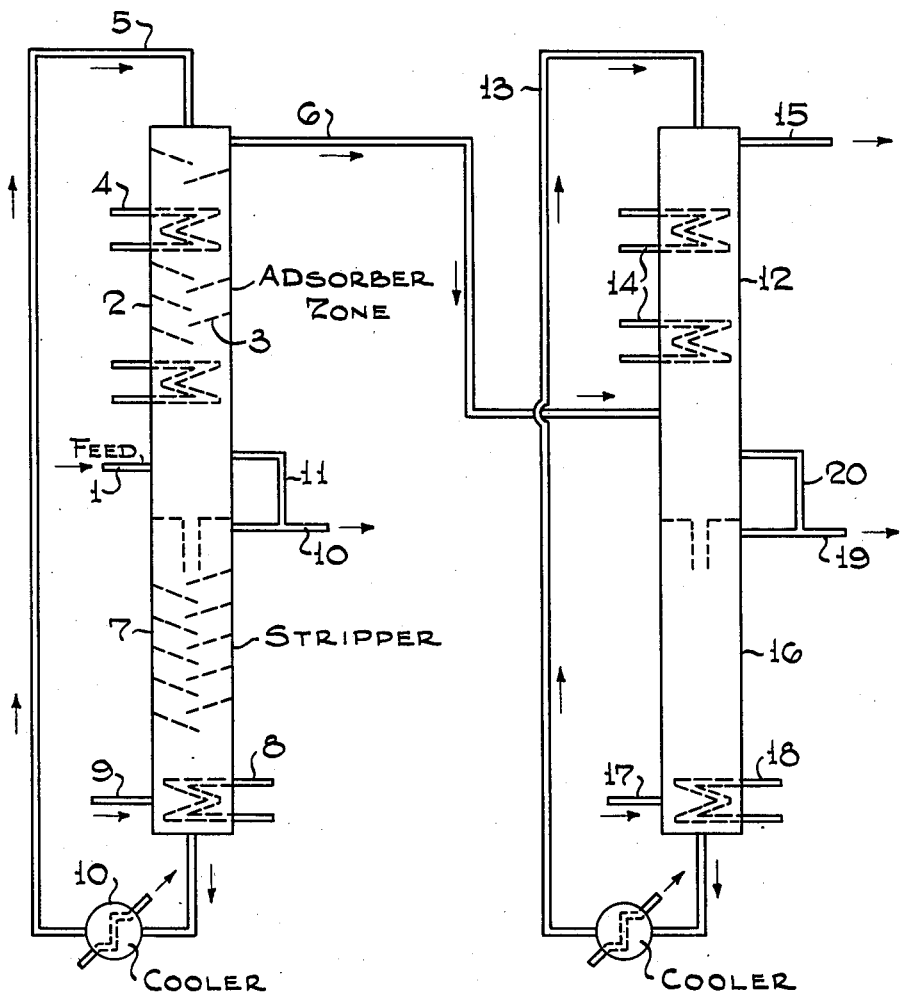

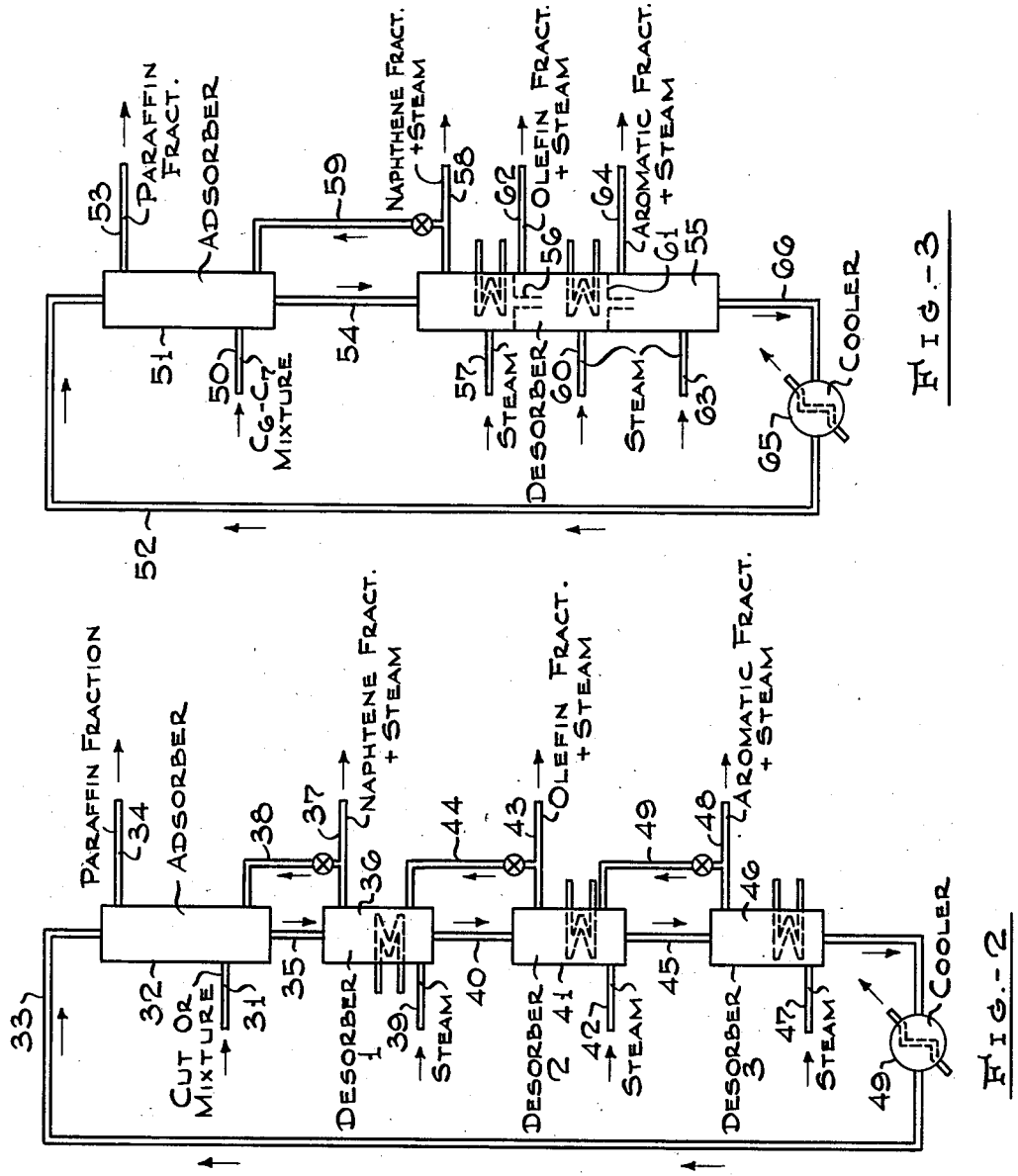

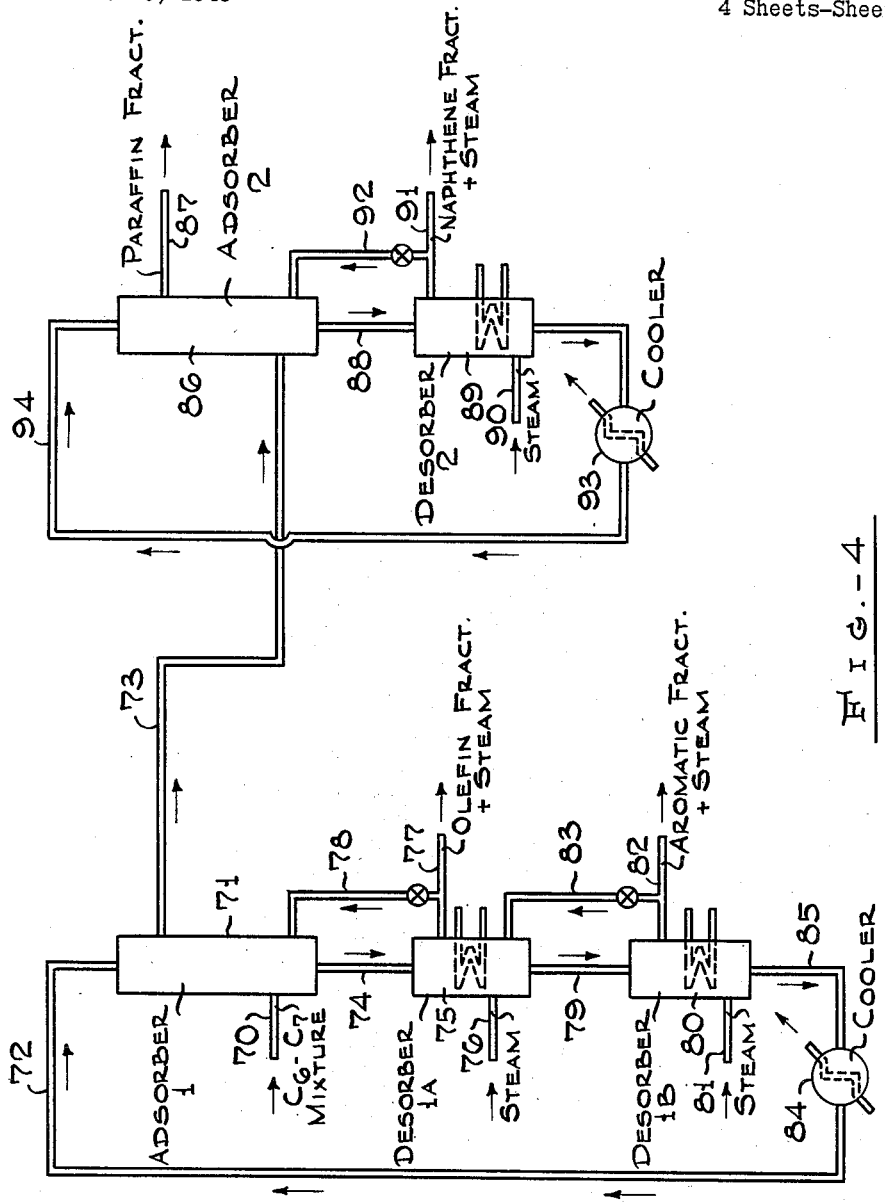

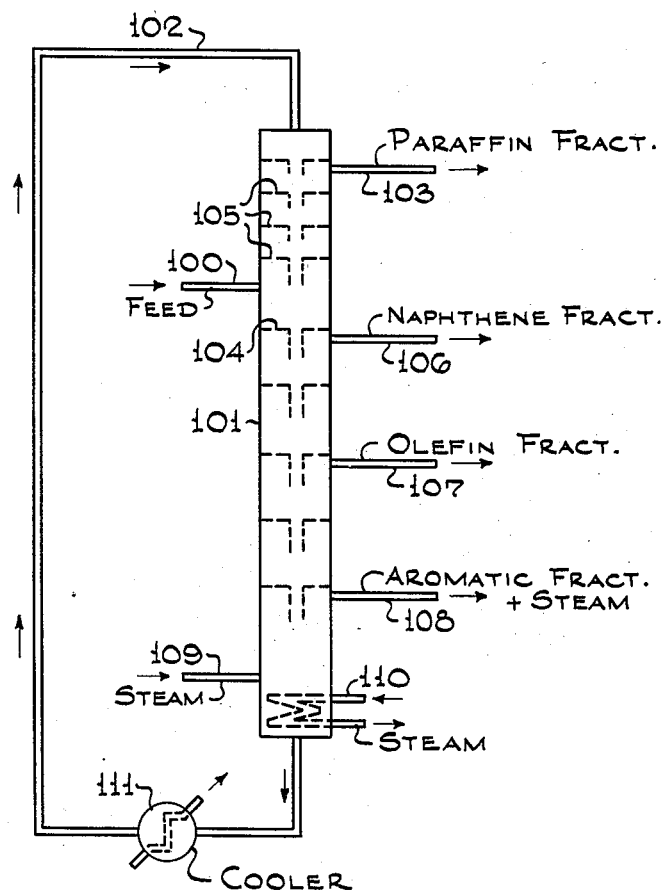

Patented Oct. 16, 1951

2,571,936

UNITED STATES PATENT OFFICE 2,571,936

SORPTION OF HYDROCARBONS BY ACTIVATED CARBON

John A. Patterson, Beverly, and Jerome P. Morgan, Maplewood, N. J., assignors to Standard Oil Development Company, a corporation of Delaware Application March 6, 1948, Serial No. 13,414

1 Claim. (Cl. 260—666)

This invention relates to improvements in the sorption of hydrocarbons by solids and relates particularly to improvements in the sorption and purification of cyclohexane and other hydrocarbons.

Activated carbon, activated charcoal, silica gel and other adsorption solids have been used to selectively adsorb various hydrocarbons as the adsorptive affinity of the solids have been found to generally vary in the following decreasing order:

1. Aromatics
2. Olefins
3. Naphthenes
4. Paraffins

When a solution of an aromatic hydrocarbon with a paraffin and a naphthene is filtered through a column of solid adsorbent, the first portion of the adsorbent comes into contact with successive portions of solution having the initial concentration of aromatic hydrocarbons. This layer of adsorbent soon reaches a state of equilibrium between the aromatic hydrocarbons in the solution of the original concentration and the amount of aromatic hydrocarbons adsorbed per unit quantity of adsorbent. As the solution moves down through the bed, successive layers of adsorbent come into contact and into equilibrium with solution of the initial concentration. Thus, extending downward from the top layer of adsorbent, a zone is formed in which the adsorbed aromatic hydrocarbon is in equilibrium with solution of the initial concentration, which fills the microscopic interstices of the adsorbent. With continued introduction of solution at the top of the column this equilibrium zone extends farther and farther down the tube, forcing the aromatic-free material ahead of it with (if the filtration is not too rapid) a comparatively narrow region between the equilibrium zone and the aromatic-free zone. Finally the equilibrium zone reaches the bottom or last layer of adsorbent, and at this point solution containing the initial concentration of aromatic hydrocarbons just begins to emerge as filtrate from the bottom of the column of adsorbent.

It is apparent that the treatment of a solution of an aromatic hydrocarbon in a paraffin and naphthene in the manner just described may yield a portion of the charge as aromatic-free material, but that a quantitative separation of paraffinic hydrocarbons is not possible by this process alone.

An object of this invention is to separate paraffins and naphthenes from the aromatics, and also from each other in substantially pure form. The boiling points of the various hydrocarbons having from 6–7 carbon atoms to the molecule, range from 49.7° C. to 115° C. Cyclohexane boils at 80.8° C., benzene boils at 80.2° C., and the azeotrope of these two hydrocarbons boils at 77.5° C. Although in distilling a mixture of $C_6$ to $C_7$ hydrocarbons, various azeotropes will be formed, therefore, in following out this method of separating cyclohexane, a cut boiling between 70°–85° C., will contain the major fraction of cyclohexane, together with paraffins, aromatics, olefins and naphthenes. This cut can then be separated in a plurality of stages of adsorption and desorption. The separation may be carried out in either a liquid or vapor phase system.

The invention will be more fully understood by reading the following description with reference to the accompanying drawing.

Fig. 1 showing the flow of materials in a vapor phase system.

Fig. 2 showing a modification of the said system.

Fig. 3 showing a further modification of the flow plan.

Fig. 4 showing a further modification of stripping in the desorption system, and Fig. 5 showing a system in which paraffins and naphthenes are separated.

Referring to Fig. 1, an example of a vapor phase operation, a $C_6$ to $C_7$ cut, preferably one boiling between 70°–85° C., is introduced into a lower part of an adsorber zone 2, by means of pipe 1, the adsorber 2 which is provided with a number of baffles or plates 3, and heat regulating coils 4, for maintaining the temperature at the desired adsorption level. An adsorbent such as activated carbon of 200–500 mesh is passed into the top of the adsorber zone 2 by means of pipe 5 which may or may not be a standpipe. The $C_6$ to $C_7$ cut is passed in countercurrent flow to the adsorbent and from the upper part of adsorber zone, a substantially aromatic- and olefin-free fraction of the $C_6$ to $C_7$ hydrocarbons is removed through pipe 6. The adsorbent with the aromatics, and olefins adsorbed therein is passed to a stripper zone provided with a steam coil 8 and superheated steam is supplied by means of pipe 9, and the aromatics and olefins are desorbed from the carbon and removed through pipe 10, at the upper part of the stripper 7. An essentially dry fraction of the aromatics and olefins may be refluxed to the bottom of the adsorber 2, by means of pipe 11 to desorb any of the naphthenes and paraffins that may be held by the adsorbent at the lower part of the adsorber zone 2 or an internal reflux is obtained by maintaining a back pressure on product stream. The adsorbent free of hydrocarbons is then passed from the bottom of the stripper zone 7 through pipe 5 and through cooler 10 to the upper part of adsorber 2. The hydrocarbons removed through pipe 6 are passed to a second adsorber zone 12 and then passed in counter current flow to an adsorbent supplied to the adsorber by means of pipe 13. Heat regulating coils 14 are provided in the adsorber zone 12 which may be provided with plates or baffles. The hydrocarbon fraction after passing in countercurrent flow to the adsorbent in adsorber zone 12, which may likewise be activated carbon, is removed through pipe 15 and is substantially a paraffin fraction. The adsorbent is passed from the adsorber zone 12, to a stripper zone 16 where it is stripped of its hydrocarbons by means of superheated steam supplied through pipe 17 and coil 18. The hydrocarbons consisting of substantially pure naphthenes of at least 80% concentration, is removed through pipe 19. A fraction of this stream may be refluxed through pipe 20 to the bottom of adsorber 12 to desorb any paraffins that will be present in the adsorbent, passed to stripper 16. The naphthene fraction removed through pipe 19 can be readily fractionally distilled to obtain pure cyclohexane. The adsorbent free of the naphthenes is then recycled through pipe 13 to the top of adsorber 12, after passing through cooler 21.

Referring to Fig. 2, $C_6$ to $C_7$ hydrocarbon mixture preferably of a boiling range of 70°–85° C. is passed through pipe 31 to the lower part of an adsorber 32, which adsorber may be provided with baffles or plates. The hydrocarbon mixture is then passed in countercurrent flow to a solid adsorbent, such as activated carbon, or activated charcoal which is introduced into the adsorber by means of pipe 33. Adsorbent circulation is regulated so that substantially pure paraffins of at least 80% concentration are removed through pipe 34. The adsorbent with the naphthenes, olefins or aromatics adsorbed or occluded is passed from adsorber 32 by pipe 35 to desorber 36 where it is heated to desorb substantially all of the naphthenes without disturbing the bulk of the adsorbed olefins and aromatics. The desorbed naphenes are removed by means of pipe 37 from the desorber and an essentially dry fraction of naphthenes is refluxed to the bottom of adsorber 32 by means of pipe 38 to selectively displace any paraffin remaining on the adsorbent. Superheated steam for removing the naphthenes from the adsorbent is provided by means of pipe 39 to the bottom of desorber 36. Following desorption of the naphthenes the powdered or finely divided adsorbent is then removed by means of pipe 40 to the top of a second desorber 41 to which superheated steam is supplied by means of pipe 42 to desorb substantially all of the olefins which are removed by means of pipe 43, and a dry fraction is refluxed to the bottom of desorber 41 by means of pipe 44. The residual adsorbent with the aromatics as the adsorbate is then passed by means of pipe 45 to the top of a third desorber 46 to which superheated steam is supplied by means of pipe 47 to expel all of the remaining hydrocarbons in the adsorber which are removed through pipe 48, and the essentially dry fraction being refluxed to the bottom of desorber 41 by means of pipe 49. The hot, stripped adsorbent is then removed through pipe 33 and recycled to the top of adsorber 32 after passing through cooler 49.

Referring to Fig. 3, a $C_6$ to $C_7$ hydrocarbon mixture containing cyclohexane is passed through pipe 50 to the lower part of an adsorber 51 and passed in countercurrent flow to the solid adsorbent such as activated carbon introduced into the top of the adsorber by means of pipe 52. The temperatures of the hydrocarbon mixture and the solid adsorbent, as well as the amount of the latter circulated are regulated so that substantially all of the naphthenes, olefins and aromatics are adsorbed. The unadsorbed hydrocarbon, that is, the paraffin fraction, is removed from the adsorber 51 by means of pipe 53. The solid adsorbent with the naphthenes, olefins and aromatics adsorbed therein is passed through pipe 54 to the top of a stripping tower 55 which is provided with a plurality of plates, and superheated steam is introduced above the top plate 56 by means of pipe 57, where naphthenes are expelled from the solid adsorbent and removed by a side stream through pipe 58, an essentially dry fraction being refluxed to the bottom of the adsorber 51, by means of pipe 59, to remove any paraffins that may remain adsorbed on the solid adsorbent. Superheated steam is provided by means of pipe 60 to the top of plate 61, olefins thus desorbed from the solid adsorbent are removed through pipe 62. A stream of superheated steam is passed through pipe 63 to the lower part of the tower 55, aromatics are thus desorbed and removed from the stripping tower by means of pipe 63. The hot stripped adsorbent is then removed from the bottom of tower 55 through pipe 66, and after passing through cooler 65 are recycled to the top of the adsorber 51. The naphthene fraction which is removed through pipe 58 may be readily fractionally distilled to obtain pure cyclohexane.

Referring to Fig. 4, a $C_6$ to $C_7$ hydrocarbon mixture is passed through pipe 70 to an adsorber 71, where it passes in countercurrent flow to a solid adsorbent such as activated carbon introduced to the top of the tower by means of pipe 72. The temperature and quantity of solid adsorbent are regulated to absorb the olefins and the aromatic fractions, and the unabsorbed fraction, consisting of paraffins and naphthenes is removed through pipe 73 from the adsorber 71. The solid adsorbent with the olefins and aromatics therein is passed through pipe 74 to top of tower 75. The lower part of this tower is supplied with superheated steam by means of pipe 76 for desorbing and stripping off the olefins which are in turn removed through pipe 77, a dry fraction of the olefins being recycled by means of pipe 78 to the lower part of the adsorber 71. Solid adsorbent with aromatics adsorbed on it is then removed through pipe 79 to desorber 80 to which superheated steam is provided by means of pipe 81 to expel the residual aromatic fraction of the solid adsorbent which is removed through pipe 82, a part of the fraction may be passed through pipe 83 and refluxed to desorber 75. The hot, stripped, solid adsorbent is removed through pipe 85 from desorber 80, and after passing through cooler 84 is recycled to the top of the adsorber 71.

The paraffin and naphthene fraction is removed by pipe 73, to another adsorber 86 where it passes in countercurrent flow to a solid adsorbent, which likewise may be activated carbon. Said adsorbent is passed into adsorber 86 by means of pipe 94. A paraffin fraction substantially free of naphthenes is removed through pipe 87 from the adsorber 86. The solid adsorbent with the naphthenes is then passed through pipe 88 to desorber 89, where superheated steam is provided for desorbing and stripping purposes by pipe 90. The desorbed naphthene fraction is removed from desorber 89 by means of pipe 91, a dry fraction being returned as reflux to the bottom of adsorber 86 by means of pipe 92. The hot stripped solid adsorbent is recycled to adsorber 86, after passing through cooler 93. The naphthene fraction removed through pipe 91 is then fractionally distilled to recover cyclohexane.

Referring to Fig. 5, a $C_6$ to $C_7$ mixture is passed by pipe 100 into adsorber 101 where it passes in countercurrent flow to a solid absorbent introduced into the adsorber 101 by means of pipe 102. The unabsorbed paraffin fraction is removed from the adsorber 101 by means of pipe 103. Plates 104 and 105 are provided in the adsorber, and from the bottom of plate 104, a naphthene fraction is removed as a side stream by means of pipe 106. As the solid adsorbent passes further down in the adsorber 101 and is gradually heated at some point below the feed plate by superheated steam provided for desorbing and stripping purposes by means of pipe 109 and coil 110. The desorbed olefins are removed by pipe 107 as a side stream. The aromatics desorbed in the bottom section of the stripper, are removed as a side stream by means of pipe 108. The temperature gradient and the back pressure on the side streams is so regulated that the olefins substantially paraffin- and naphthene-free are removed through pipe 107 and the naphthenes substantially paraffin-free are removed through pipe 106. The hot, stripped solid adsorbent is removed from the bottom of the tower 101 by means of pipe 102 and after passing through cooler 111 is recycled to tower 101. Cyclohexane is recovered in concentrated form by conventional means from the naphthene fraction. The other fractions may be treated to recover valuable products if desirable. Temperatures up to 110° to 120° F. are maintained during the adsorption. Room temperatures are preferably used. The adsorbent is heated between 300° and 550° F. to recover the remaining adsorbate and to revivify. Temperatures up to 900° F. may be used to heat the adsorbent to recover the adsorbate although when steam is used temperatures of 600° F. are suitable.

What is claimed is:

A process for recovering cyclohexane from a $C_6$–$C_7$ hydrocarbon mixture containing cyclohexane together with paraffin, olefin and aromatic hydrocarbons by means of adsorption on activated carbon which comprises passing said carbon downwardly through an adsorption zone, introducing the $C_6$–$C_7$ hydrocarbon mixture in vapor phase into a lower portion of the adsorption zone, contacting the ascending hydrocarbon vapors countercurrently with the descending carbon whereby the cyclohexane, olefin and aromatic hydrocarbons become preferentially adsorbed on the carbon, removing unadsorbed hydrocarbons from an upper portion of the adsorption zone, withdrawing rich activated carbon containing adsorbed thereon cyclohexane, olefin and aromatic hydrocarbons from the adsorption zone and passing it downwardly successively through a first, second and third desorption zone, heating the activated rich carbon in the first desorption zone to a first desorption zone to a first desorption temperature of about 300° F. to liberate therefrom a cyclohexane stream, returning a portion of the cyclohexane as reflux to a lower portion of the adsorption zone, heating the activated carbon freed of cyclohexane but containing adsorbed olefins and aromatics thereon in the second desorption zone at a temperature higher than that in the first desorption zone, recovering a vapor stream of olefin hydrocarbons from the second desorption zone, returning a portion of the withdrawn olefin hydrocarbons to the first desorption zone, heating the activated carbon containing adsorbed aromatic hydrocarbons in a third desorption zone at a higher temperature than in the second desorption zone but not above 550° F. to remove the aromatic hydrocarbons from the carbon, withdrawing the aromatic hydrocarbons from the third desorption zone and returning a portion thereof to the second desorption zone.

JOHN A. PATTERSON.
JEROME P. MORGAN.

REFERENCES CITED

The following references are of record in the file of this patent:

UNITED STATES PATENTS

| Number | Name | Date |
| --- | --- | --- |
| 2,384,311 | Kearby | Sept. 4, 1945 |
| 2,398,101 | Lipkin | Apr. 9, 1946 |
| 2,470,339 | Claussen et al. | May 17, 1949 |

OTHER REFERENCES

Hirschler et al., Ind. Eng. Chem., vol. 39, 1585–96 (1947).

Mair, Jour. Res. Nat. Bur. Stand., vol. 34, 435–451 (1945).

Turner Petroleum Refiner, vol 22, 98 [140]–102 [144] (1943).